Patented May 5, 1936

2,039,344

UNITED STATES PATENT OFFICE 2,039,344

METHOD OF MAKING TERTIARY ALKYL PHENOLS

Mark E. Putnam, Edgar C. Britton, and Ralph P. Perkins, Midland, Mich., assignors to The Dow Chemical Company, Midland, Mich., a corporation of Michigan No Drawing. Application December 1, 1932,
Serial No. 645,231

17 Claims. (Cl. 260—154)

The present invention concerns an improved method of making 4-tertiary-alkyl-phenols and a new compound made by such method.

In a co-pending application of R. P. Perkins, A. J. Dietzler, and J. T. Lundquist, Serial No. 624,046, filed July 22, 1932, it is disclosed that when a tertiary-alkyl halide is reacted with a phenol, having the 2 and 4 positions thereof free, in the presence of a catalyst and at a temperature between about 50° and 200° C., there is formed the corresponding 4-tertiary-alkyl-phenolic compound along with appreciable quantities of the corresponding 2-tertiary-alkyl-phenolic compound and 2.4-di-tertiary-alkyl-phenolic compound. In preparing a 4-tertiary-alkyl-phenol according to said method, considerable material is lost through by-product formation and the desired product must be separated from isomeric and other closely related by-products. A complete separation of a 4-tertiary-alkyl-phenol from its 2-tertiary-alkyl-phenol isomer is usually a difficult and expensive operation to carry out.

We have now found that, when a tertiary-alkyl halide, e. g. tertiary-butyl chloride, is reacted with a phenol in the presence of a catalyst at a temperature below about 50° C., the corresponding 4-tertiary-alkyl-phenol is formed as substantially the only mono-tertiary-alkyl-phenol reaction product. By carrying the reaction out at a temperature below 50° C., then, the difficult and expensive step of separating the 4-tertiary-alkyl-phenol product from isomeric by-products is avoided. We have further found that the yield of poly-alkylated by-products, e. g. 2.4-di-tertiary-butyl-phenol, etc., is always lower when the condensation reaction is carried out at a temperature below 50° C. Usually poly-alkylated phenolic by-products are formed in inappreciable quantity, if at all, when operating according to the present method.

To the accomplishment of the foregoing and related ends, the invention, then, consists of the method and product hereinafter fully described and particularly pointed out in the claims, the following description and examples setting forth in detail several modes of carrying out the invention, such disclosed modes illustrating, however, but several of the various ways in which the principle of the invention may be used.

In preparing a 4-tertiary-alkyl-phenol according to our method a desired quantity of a reaction catalyst, e. g. aluminum chloride, may be added gradually and with stirring to a reaction mixture containing a tertiary-alkyl halide and a phenol and the mixture may be stirred and maintained at a temperature below 50° C. until the reaction is substantially complete. Again, if desired, the catalyst may first be added to the tertiary-alkyl halide and the phenol reactant may be added gradually and with stirring to such mixture while maintaining the latter at a temperature below 50° C. We prefer, however, to add a tertiary-alkyl halide, e. g. tertiary-butyl chloride, with stirring, to a mixture containing a phenol, a catalyst capable of promoting reaction between an alkyl halide and a phenol, e. g. aluminum chloride, ferric chloride, zinc chloride, etc., and a solvent present in amount sufficient to maintain the mixture in a fluid condition.

The above mentioned reactants and catalyst may be employed in any relative quantities, but in practice we prefer to employ at least one mole of the phenol for each mole of tertiary-alkyl halide used and to employ the catalyst in amount representing between about 0.25 and 5 per cent the weight of phenol used. As a reaction solvent, we find it most convenient to employ an excess of the phenol reactant. However, any of a wide variety of relatively inert solvents can be employed as a reaction medium, among which are benzene, chlorobenzene, orthodichlorobenzene, liquid paraffin hydrocarbons, carbon bisulphide, etc. If a reaction solvent is not employed, the mixture usually solidifies before the reaction is complete with the result that efficient stirring thereafter becomes impossible, the reaction proceeds at a relatively slow rate, temperature control becomes difficult, and after the reaction is completed, it is difficult to render the catalyst inactive or to remove the same from the reaction mixture while maintaining the latter at a temperature below 50° C. If the mixture is heated to a temperature appreciably higher than 50° C. in the presence of the active reaction catalyst, the 4-tertiary-alkyl-phenol product is liable to undergo molecular rearrangement with formation of difficultly separable by-products.

During the course of the above condensation reaction, the reaction mixture is stirred and maintained in fluid condition at a temperature below 50° C. The reaction can be carried out at 5° C. and in some instances at even lower temperatures, but the preferred reaction temperature range is between about 20° and 50° C.

If, in carrying out the reaction according to any of the modes of operation previously mentioned, the catalyst is initially employed in large amount or the reactants are intermixed too rapidly in the presence of such quantity of catalyst, the reaction is liable to be violent and difficult to control. We have found that the speed of reaction can be controlled either by controlling the rate at which the catalyst is added to a mixture of the reactants or by controlling the rate at which either reactant is added to a mixture of the catalyst with the other reactant.

After the reaction is substantially completed the reaction mixture is treated in any of the usual ways to remove the catalyst therefrom. The mixture can, for instance, be extracted with a relatively small quantity of water or aqueous strong mineral acid, such as hydrochloric or sulphuric acid, to remove the catalyst, or the mixture can be treated with a relatively small quantity of an aqueous basic compound (e. g. sodium hydroxide, sodium carbonate, potassium carbonate, calcium carbonate, lime, etc.) and then be filtered to separate the aluminum, iron, or zinc compounds as a residue. As previously mentioned, it is important that the catalyst be rendered catalytically inactive or be removed from the reaction mixture while maintaining the latter at a temperature below 50° C. After the catalyst has been removed from the reaction mixture, the 4-tertiary-alkyl-phenol product can be isolated in any of the usual ways. For instance, the reaction solvent can usually be distilled from the organic mixture to leave the substantially pure 4-tertiary-alkyl-phenol product as a residue, the entire organic mixture can be fractionally distilled to separate said product, or the 4-tertiary-alkyl-phenol may be fractionally crystallized from the organic mixture.

During preparation of a 4-tertiary-alkyl-phenol according to the above described method, a relatively small quantity of unreacted tertiary-alkyl halide is sometimes vaporized from the reaction mixture along with gaseous hydrogen halide which is liberated during the course of the reaction. In order to avoid loss of such unreacted tertiary-alkyl halide, we prefer to pass the vapors issuing from the reaction mixture into a second fluid mixture containing the phenol and a reaction catalyst, wherein tertiary-alkyl halide present in said vapors is reacted to form an additional quantity of the 4-tertiary-alkyl-phenol.

The following examples set forth several ways in which the principle of our invention may be employed. It is to be understood, however, that said examples are purely illustrative and are not to be construed as a limitation on the invention.

*Example 1*

6.0 grams of aluminum chloride was added gradually and with stirring to a mixture of 300 cubic centimeters of chlorobenzene, 100 grams (1.06 moles) of phenol, and 115 grams (1.25 moles) of tertiary-butyl-chloride. The mixture was stirred and maintained at a temperature between 20° and 26° C. for a period of 16 hours, during which period hydrogen chloride was evolved continuously. An additional 2-gram portion of aluminum chloride was added and the reaction mixture was stirred and maintained within the above mentioned temperature range for 5 hours longer, i. e. until the evolution of hydrogen chloride from the mixture had substantially ceased. 35 grams of sodium carbonate and 15 cubic centimeters of water were added to the reaction mixture, the latter was agitated so as to obtain thorough mixing and was then filtered. The filtrate was fractionally distilled, there being separated by such distillation 17 grams (0.18 mole) of unreacted phenol and 126.5 grams (0.843 mole) of substantially pure 4-tertiary-butyl phenol. The yield of 4-tertiary-alkyl-phenol was 95.5 per cent of theoretical, based on the quantity of phenol reacted.

*Example 2*

In a reactor provided with a mechanical stirrer and a vapor outlet were placed 400 grams (4.26 moles) of phenol, 139 grams (1.50 moles) of tertiary-butyl chloride, and 4 grams of aluminum chloride. The mixture was stirred and maintained at a temperature between 22° and 26° C. for 0.5 hour, after which stirring was continued and the mixture was warmed to a temperature between 48° and 51° C. for a period of 1 hour 40 minutes. The mixture was then extracted with 50 cubic centimeters of water and the aqueous extract was discarded. The residual organic mixture was fractionally distilled, 268 grams (2.85 moles) of unreacted phenol being obtained as a distillate and 195.5 grams (.130 mole) of 4-tertiary-butyl-phenol, freezing at 96.6° C., being obtained as a still residue. The yield of the last mentioned compound was 92.8 per cent of theoretical, based on the quantity of phenol reacted.

*Example 3*

Hydrogen chloride vapors evolved during the course of the reaction described in Example 2 were passed into a second mixture of 4.5 grams of aluminum chloride and 400 grams (4.26 moles) of phenol which was stirred and maintained at a temperature between 37° and 43° C. during introduction of said vapors thereto. The vapors which passed through the second reaction mixture were conducted through a trap cooled with solid carbon dioxide, but only a trace of unreacted tertiary-butyl chloride was condensed in said trap. After the reaction described in Example 2 was completed, 139 grams (1.5 moles) of tertiary-butyl chloride was gradually added to the second mixture (i. e. that into which vapors from the first reaction mixture had been passed), said second mixture being stirred and cooled to 22° C. during addition of the tertiary-butyl chloride. Stirring was continued and the mixture was heated to and maintained at a temperature between 36° and 40° C. for a period of about 2 hours 40 minutes. Hydrogen chloride vapors evolved from the reaction mixture during and after the addition of the tertiary-butyl chloride were conducted through a trap cooled with solid carbon dioxide within which 9.5 grams of unreacted tertiary-butyl chloride was condensed. The crude reaction mixture was separated into its components in a manner similar to that described in Example 2, there being obtained 265 grams (2.82 moles) of unreacted phenol and 208 grams (1.39 moles) of substantially pure 4-tertiary-butyl-phenol. The yield of the latter compound was 96.6 per cent of theoretical, based on the quantity of phenol reacted.

*Example 4*

A mixture consisting of 402 grams (4.27 moles) of phenol, 140 grams (1.31 moles) of tertiary-amyl chloride, and 6.5 grams of aluminum chloride was stirred and maintained at a temperature between 25° and 30° C. for 17.5 hours. During the course of such treatment, hydrogen chloride vapors evolved from the reaction mixture were passed through a trap cooled with solid carbon dioxide, 3.0 grams of unreacted tertiary-amyl chloride being thereby condensed. The crude reaction mixture was successively extracted with 75 cubic centimeters of 4-normal hydrochloric acid and washed with water. Unreacted phenol was then distilled from the reaction product, there being obtained 202.5 grams (1.24 moles) of substantially pure 4-tertiary-amyl-phenol (freezing at 90.6° C.) as a still residue. The yield of said product was 96 per cent of theoretical, based on the quantity of tertiary-amyl chloride reacted.

Example 1, above, illustrates the fact that tertiary-butyl chloride can be reacted with phenol in the presence of a considerable quantity of a relatively non-reactive solvent at a temperature below 50° C. to form 4-tertiary-butyl-phenol in high yield without isomers of said compound being formed in appreciable quantity. Example 2 shows that similar results can be obtained by employing an excess of phenol as the reaction solvent. Example 3 shows that a portion of the tertiary-butyl chloride reactant may be vaporized from the reaction mixture along with hydrogen chloride vapors liberated during reaction, but that substantially all of the tertiary-butyl chloride employed can be reacted by passing vapors emitted from the principal reaction mixture through a second reaction mixture containing a phenol and a reaction catalyst, e. g. aluminum chloride. Example 4 shows that tertiary-amyl-chloride can be reacted with phenol at a temperature below 50° C. in the presence of an excess of the latter as a reaction solvent to form 4-tertiary-amyl-phenol in excellent yield and as substantially the only mono-tertiary-amyl-phenol product. Example 4 further shows that a portion of the tertiary-amyl chloride reactant may be vaporized from the reaction mixture along with hydrogen chloride vapors liberated by the reaction. In order to conserve such unreacted tertiary-amyl chloride, it is preferable that vapors evolved from the principal reaction be passed through a second reaction mixture containing a phenol and a reaction catalyst.

The principle of our invention may be practiced in ways other than those described in the examples. Other tertiary-alkyl halides, e. g. tertiary-butyl bromide, tertiary-butyl iodide, tertiary-amyl bromide, a tertiary-hexyl chloride, a tertiary-hexyl bromide, etc., can be reacted with phenols according to the present method to form the corresponding 4-tertiary-alkyl-phenols without isomeric by-products being formed in appreciable quantities.

In place of phenol, substituted phenols, e. g. 2-methyl-phenol, 2-ethyl-phenol, 3-methyl-phenol, 2.3-dimethyl-phenol, 2.5-dimethyl-phenol, 2.3.5-trimethyl-phenol, 2-chloro-phenol, 2.5-dichloro-phenol, 2-isopropyl-phenol, 2-secondary-butyl-phenol, etc., may be employed as reactants in forming 4-tertiary-alkyl-phenolic compounds by the present method. The only restrictions concerning the phenol reactant which may be employed are that it must have the 4 position thereof free and that it must not bear strongly acid groups or other reactive substituents which would interfere with the course of the reaction.

Again, instead of using aluminum chloride as a reaction catalyst, we may employ ferric chloride, zinc chloride, or in fact any catalyst capable of promoting reaction between an alkyl halide and phenol at a temperature lower than 50° C.

The present invention, in brief, comprises an improved method of preparing 4-tertiary-alkyl-phenols, whereby simultaneous formation of isomeric by-products is substantially prevented, and a new compound made by such method.

The expression "liquefying solvent", where employed in a claim, refers to a material which when added to the reaction mixture in sufficient amount will form a liquid body.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method of making a 4-tertiary-alkyl-phenol which comprises reacting a tertiary-alkyl halide with a phenol having the 4-position thereof free, at a temperature below 50° C., in the presence both of a catalyst capable of promoting reaction between an alkyl chloride and phenol and of a liquefying solvent which is substantially incapable of reacting at below 50° C. with the tertiary-alkyl halide and/or phenolic reactants to form any product other than a 4-tertiary-alkyl phenol.

2. The method of making a 4-tertiary-alkyl-phenol which comprises reacting a tertiary-alkyl chloride with a phenol having the 4-position thereof free, at a temperature between 5° and 50° C., in the presence both of a catalyst selected from the class consisting of aluminum chloride, ferric chloride, and zinc chloride and a liquefying solvent which is substantially incapable of reacting at below 50° C. with the tertiary-alkyl chloride and/or phenolic reactants to form any product other than a 4-tertiary-alkyl phenol.

3. The method of making a 4-tertiary-alkyl-phenol which comprises reacting a tertiary-alkyl chloride with a phenol having the 4-position thereof free, at a temperature between 5° and 50° C., in the presence both of aluminum chloride and of a liquefying solvent which is substantially incapable of reacting at below 50° C. with the tertiary-alkyl chloride and/or phenolic reactants to form any product other than a 4-tertiary-alkyl phenol, said solvent being employed in a proportion sufficient to maintain the reaction mixture in fluid condition.

4. In a method of making a 4-tertiary-alkyl-phenol, the steps which consist in reacting a tertiary-alkyl chloride with a phenol having the 4-position thereof free, at a temperature between 20° and 50° C., in the presence both of aluminum chloride and of a liquefying solvent which is substantially incapable of reacting at below 50° C. with the tertiary-alkyl chloride and/or phenolic reactants to form any product other than a 4-tertiary-alkyl phenol, said solvent being employed in a proportion sufficient to maintain the reaction mixture in fluid condition, and thereafter rendering the aluminum chloride catalytically inactive while maintaining the reaction mixture at a temperature below 50° C.

5. The method of making a 4-tertiary-alkyl-phenol which comprises reacting a tertiary-alkyl halide with phenol, at a temperature between 5° and 50° C., in the presence both of a catalyst selected from the class consisting of aluminum chloride, ferric chloride, and zinc chloride and of a liquefying solvent which is substantially incapable of reacting at below 50° C. with the tertiary-alkyl halide and/or phenol reactants to form any product other than a 4-tertiary-alkyl phenol.

6. The method of making a 4-tertiary-alkyl-phenol which comprises reacting a tertiary-alkyl chloride with phenol, at a temperature between 20° and 50° C., in the presence both of aluminum chloride and a liquefying solvent which is substantially incapable of reacting at below 50° C. with the tertiary-alkyl chloride and/or phenol reactants to form any product other than a 4-tertiary-alkyl phenol, said solvent being employed in a proportion sufficient to maintain the reaction mixture in fluid condition.

7. In a method of making a 4-tertiary-alkyl phenol, the steps which consist in reacting a tertiary-alkyl chloride with phenol at a temperature between about 20° and about 50° C. in the presence both of aluminum chloride and of a liquefying solvent which at temperatures below 50° C. is substantially incapable of reacting with the tertiary-alkyl chloride and/or phenol reactants to form any product other than a 4-tertiary-alkyl phenol, and thereafter rendering the aluminum chloride catalytically inactive while maintaining the reaction mixture at a temperature below 50° C.

8. In a method of making a 4-tertiary-alkyl-phenol, the steps which consist in reacting a tertiary-alkyl chloride with phenol, at a temperature between 20° and 50° C., in the presence both of aluminum chloride and of a liquefying solvent which is substantially incapable of reacting with the tertiary-alkyl chloride and/or phenol reactants to form any product other than a 4-tertiary-alkyl phenol, said solvent being employed in a proportion sufficient to maintain the reaction mixture in fluid condition, and passing vapors evolved during the reaction into a second reaction mixture containing phenol and aluminum chloride.

9. The method of making 4-tertiary-butyl-phenol which comprises reacting a tertiary-butyl halide with phenol in the presence of a catalyst selected from the class consisting of aluminum chloride, ferric chloride, and zinc chloride, and at a temperature between 5° and 50° C.

10. The method of making 4-tertiary-butyl-phenol which comprises reacting tertiary-butyl chloride with phenol, at a temperature between 20° and 50° C., in the presence both of aluminum chloride and a liquefying solvent which is substantially incapable of reacting at below 50° C. with the tertiary-butyl chloride and/or phenol reactants to form any product other than 4-tertiary-butyl-phenol, said solvent being employed in proportion sufficient to maintain the reaction mixture in fluid condition.

11. The method of making 4-tertiary-butyl-phenol which comprises reacting tertiary-butyl chloride with phenol in the presence both of a sufficient excess of phenol to maintain the reaction mixture in fluid condition and of aluminum chloride, and at a temperature between 20° and 50° C.

12. In a method of making 4-tertiary-butyl-phenol, the steps which consist in reacting tertiary-butyl chloride with phenol at a temperature between about 20° and about 50° C. in the presence both of aluminum chloride and of a liquefying solvent which at temperatures below 50° C. is substantially incapable of reacting with the tertiary-butyl chloride and/or phenol reactants to form any product other than tertiary-butyl phenol, said solvent being employed in proportion sufficient to maintain the reaction mixture in fluid condition, and thereafter rendering the aluminum chloride catalytically inactive while maintaining the reaction mixture at a temperature below 50° C.

13. The method of making a 4-tertiary-amyl-phenol which comprises reacting a tertiary-amyl halide with phenol in the presence of a catalyst selected from the class consisting of aluminum chloride, ferric chloride, and zinc chloride, and at a temperature between 5° and 20° C.

14. The method of making 4-tertiary-amyl-phenol which comprises reacting tertiary-amyl chloride with phenol, at a temperature between 20° and 50° C., in the presence both of aluminum chloride and a liquefying solvent which is substantially incapable of reacting at below 50° C. with the tertiary-amyl chloride and/or phenol reactants to form any product other than 4-tertiary-amyl-phenol, said solvent being employed in a proportion sufficient to maintain the reaction mixture in fluid condition.

15. The method of making 4-tertiary-amyl-phenol which comprises reacting tertiary-amyl chloride with phenol in the presence both of a sufficient excess of phenol to maintain the reaction mixture in fluid condition and of aluminum chloride, and at a temperature between 20° and 50° C.

16. In a method of making 4-tertiary-amyl-phenol, the steps which consist in reacting tertiary-amyl chloride with phenol at a temperature between about 20° and about 50° C. in the presence both of aluminum chloride and of a liquefying solvent which at temperatures below 50° C. is substantially incapable of reacting with the tertiary-amyl chloride and/or phenol reactants to form any product other than 4-tertiary-amyl phenol, said solvent being employed in proportion sufficient to maintain the reaction mixture in fluid condition, and thereafter rendering the aluminum chloride catalytically inactive while maintaining the reaction mixture at a temperature below 50° C.

17. The method which comprises reacting a 4-tertiary-alkyl chloride with a phenol having the 4-position thereof free, in liquid phase at a temperature below 50° C. and in the presence of a catalyst capable of promoting reaction between an alkyl chloride and phenol, to form a 4-tertiary-alkyl phenol.

MARK E. PUTNAM.
EDGAR C. BRITTON.
RALPH P. PERKINS.